US007319392B2

(12) United States Patent
Babich et al.

(10) Patent No.: US 7,319,392 B2
(45) Date of Patent: Jan. 15, 2008

(54) GLASSBREAK ALARM RECORDER FOR FALSE ALARM VERIFICATION

(75) Inventors: Thomas S Babich, Glen Cove, NY (US); Kevin G Piel, Ronkonkoma, NY (US); Richard A Smith, El Dorado Hills, CA (US); Thomas R Petek, Sacramento, CA (US)

(73) Assignee: Honeywell International Inc., Morristown, NJ (US)

( * ) Notice: Subject to any disclaimer, the term of this patent is extended or adjusted under 35 U.S.C. 154(b) by 188 days.

(21) Appl. No.: 11/193,886

(22) Filed: Jul. 29, 2005

(65) Prior Publication Data

US 2007/0024443 A1 Feb. 1, 2007

(51) Int. Cl.

| | |
|---|---|
| ***G08B 3/10*** | (2006.01) |
| ***G08B 1/08*** | (2006.01) |
| ***G08B 13/00*** | (2006.01) |
| ***G08B 21/00*** | (2006.01) |
| ***G08B 13/08*** | (2006.01) |
| ***B60R 25/10*** | (2006.01) |

(52) U.S. Cl. .............................. 340/545.2; 340/384.5; 340/384.7; 340/426.18; 340/426.27; 340/539.16; 340/539.22; 340/539.26; 340/540; 340/541; 340/545.1; 340/545.3; 340/550; 340/566

(58) Field of Classification Search ............ 340/539.1, 340/539.16, 539.22, 539.26, 540–541, 545.1, 340/545.2, 545.3, 550, 566, 426.18, 426.27, 340/384.5, 384.7

See application file for complete search history.

(56) References Cited

U.S. PATENT DOCUMENTS

| | | | | |
|---|---|---|---|---|
| 4,750,197 | A * | 6/1988 | Denekamp et al. | 455/404.2 |
| 5,602,426 | A * | 2/1997 | Ecker | 307/10.2 |
| 5,663,714 | A * | 9/1997 | Fray | 340/692 |
| 5,805,064 | A * | 9/1998 | Yorkey | 340/550 |
| 6,064,303 | A * | 5/2000 | Klein et al. | 340/506 |
| 6,236,313 | B1 * | 5/2001 | Eskildsen et al. | 340/550 |
| 6,288,643 | B1 * | 9/2001 | Lerg et al. | 340/540 |
| 6,351,214 | B2 * | 2/2002 | Eskildsen et al. | 340/550 |
| 6,420,975 | B1 * | 7/2002 | DeLine et al. | 340/815.4 |
| 6,433,683 | B1 * | 8/2002 | Robinson | 340/540 |
| 6,577,234 | B1 * | 6/2003 | Dohrmann | 340/540 |
| 6,833,788 | B1 * | 12/2004 | Smith et al. | 340/541 |
| 6,882,280 | B2 * | 4/2005 | Ferragut, II | 340/587 |
| 6,897,767 | B2 * | 5/2005 | Kim | 340/426.35 |

(Continued)

OTHER PUBLICATIONS

ISR and Written Opinion for PCT/US06/28904, Feb. 16, 2007.

*Primary Examiner*—Benjamin C. Lee
*Assistant Examiner*—Lam Pham
(74) *Attorney, Agent, or Firm*—Anthony R. Barkume PC

(57) ABSTRACT

A glass breakage detector (100) having an acoustic transducer (102) for sensing first acoustic waves (130) and for providing a first analog signal (110) representative of the received first acoustic waves (130), an analog to digital converter circuit (104) adapted to convert the first analog signal (110) to a digital signal (112), processing circuitry (106) adapted to process the digital signal (112) to determine if the received first acoustic waves (130) are a result of glass breakage and generate an alarm signal (116) when it is determined that the received first acoustic waves (130) are a result of glass breakage, and a memory circuit (108), wherein the processing circuitry (106) is adapted to cause the memory circuit (108) to store the digital signal (112) for subsequent retrieval and analysis.

17 Claims, 3 Drawing Sheets

U.S. PATENT DOCUMENTS

| | | | | |
|---|---|---|---|---|
| 6,975,220 | B1 * | 12/2005 | Foodman et al. | 340/531 |
| 7,079,014 | B2 * | 7/2006 | Steinetz et al. | 340/392.1 |
| 7,106,193 | B2 * | 9/2006 | Kovach | 340/541 |
| 2002/0163430 | A1 * | 11/2002 | Bergman et al. | 340/531 |
| 2003/0061344 | A1 | 3/2003 | Monroe | |
| 2005/0017869 | A1 * | 1/2005 | Fielmann | 340/686.6 |
| 2005/0207487 | A1 | 9/2005 | Monroe | |
| 2006/0177071 | A1 * | 8/2006 | Eskildsen | 381/56 |

* cited by examiner

GLASSBREAK ALARM RECORDER FOR FALSE ALARM VERIFICATION

TECHNICAL FIELD

This invention relates to security systems, and in particular to a security system device that digitizes and records acoustic signals sensed from an event so that the event may be at least partially recreated for false alarm triggering analysis.

BACKGROUND ART

Security systems often employ the use of a glass breakage detector in order to sense if glass may be broken in a protected space, such as a commercial establishment or residential dwelling. Glass breakage detectors typically use acoustic sensors that detect acoustic waves that occur as a result of an acoustic event, digitize the sensed acoustic waves, and then process the digitized signals to determine if the characteristics of the acoustic waves are indicative of a glass breakage event (e.g. a window pane breaking). If the detector determines that the sensed acoustic signals occurred as a result of glass breakage, then an alarm signal is generated and transmitted to the security system control panel for further processing, such as sounding local alarm, notifying a central station monitoring service, etc.

False alarms are a problem in the security industry. Although it is simple to ascertain which detector created the alarm signal, it is more difficult to determine what event or sequence of events caused that detector to declare the alarm condition. With particular regard to glass breakage detectors, it could be one of many sources, and troubleshooting the site and modifying the installation to improve the performance can be guesswork. Thus, it is desired to be able to study the characteristics of the signals that caused the occurrence of the glass breakage alarm, in particular to record and later reproduce the acoustic waves that are determined by the glass breakage detector to be the result of glass breakage.

DISCLOSURE OF THE INVENTION

The glass breakage detector of the present invention records and stores the signals representing the acoustical sounds that lead up to the declaration of an alarm. In the case of a false alarm, the recording can be analyzed with a view to modifying the installation to prevent future false alarms.

In the prior art, the user's choices are to reduce coverage of the detector (to reduce or eliminate the false alarms) or tolerate the false alarms. With data acquisition and analysis capability, unusual acoustic events, extreme EMI, animal activity and some forms of tampering could be detected. In an alternative embodiment described herein, this invention may be extended to an acoustic listening module for troubleshooting that could be added to a motion detector, smoke detector, etc.

The glass breakage detector of the present invention records the sensed glass breakage signals and stores them in memory, then allows analysis of the recording to determine the cause of the false alarm. For preliminary on-site evaluation, the recording may be played back via an onboard speaker, or by connecting to a glass breakage simulator which already employs a speaker, or by sending the recording to the alarm system. For detailed analysis the recording could be sent to the central station via the alarm reporting route. The preferred method would be to retrieve the stored data for analysis, since some important parts of the signal are outside of audible range. Such method would be to digitize the microphone signal within the sensor for retrieval via a data port or other method.

Thus, in a first embodiment, the present invention is a glass breakage detector that includes an acoustic transducer for sensing first acoustic waves and for providing a first analog signal representative of the received first acoustic waves. An analog to digital converter circuit is adapted to convert the first analog signal to a digital signal. Processing circuitry is adapted to process the digital signal to determine if the received first acoustic waves are a result of glass breakage, and to generate an alarm signal when it is determined that the received first acoustic waves are a result of glass breakage. The glass breakage detector also has memory circuit, wherein the processing circuitry is adapted to cause the memory circuit to store the digital signal for subsequent retrieval and analysis.

The processing circuitry may be further adapted to cause the memory circuit to store the digital signal when the processing circuitry determines that the received first acoustic waves are a result of glass breakage.

The glass breakage detector may further have a digital to analog converter adapted to convert a digital signal stored in the memory circuit to a second analog signal, and a speaker adapted to convert the second analog signal to second acoustic waves. In this case, the processing circuitry is further adapted to retrieve a previously stored digital signal from the memory circuit, and cause the digital to analog converter to convert the digital signal to a second analog signal for conversion to second acoustic waves suitable for being heard by an observer of the glass breakage detector.

The glass breakage detector may also have data transmission circuitry, wherein the processing circuitry is further adapted to retrieve a previously stored digital signal from the memory circuit, and cause the data transmission circuitry to transmit the digital signal over a data transmission path to which the data transmission circuitry is operably coupled.

In an alternative embodiment of the present invention, the acoustic signal recording/playback/transmission features are implemented in a security system device that does not typically have a glass breakage detector included therein. This, the alternative embodiment has an alarm device having a first transducer adapted to sense a physical event in a protected space and generate a first input signal indicative of sensing the physical event, and first processing circuitry adapted to analyze the input signal and generate an alarm signal when the input signal meets predefined criteria. In addition, there is an acoustic transducer for sensing first acoustic waves and for providing a first analog signal representative of the received first acoustic waves, an analog to digital converter circuit adapted to convert the first analog signal to a digital signal, a memory circuit, and second processing circuitry adapted to cause the memory circuit to store the digital signal for subsequent retrieval and analysis.

The security system device may also have a digital to analog converter adapted to convert a digital signal stored in the memory circuit to a second analog signal; and a speaker adapted to convert the second analog signal to second acoustic waves. The second processing circuitry would be further adapted to retrieve a previously stored digital signal from the memory circuit, and cause the digital to analog converter to convert the digital signal to a second analog signal for conversion to second acoustic waves suitable for being heard by an observer of the security system device.

The security system device may also have data transmission circuitry, wherein the second processing circuitry is further adapted to retrieve a previously stored digital signal from the memory circuit, and cause the data transmission circuitry to transmit the digital signal over a data transmission path to which the data transmission circuitry is operably coupled.

For example, the security system device of this embodiment may include a passive infrared motion sensor, a microwave motion sensor, a window or door opening sensor, or a smoke alarm.

BEST MODE FOR CARRYING OUT THE INVENTION

Figure 1:
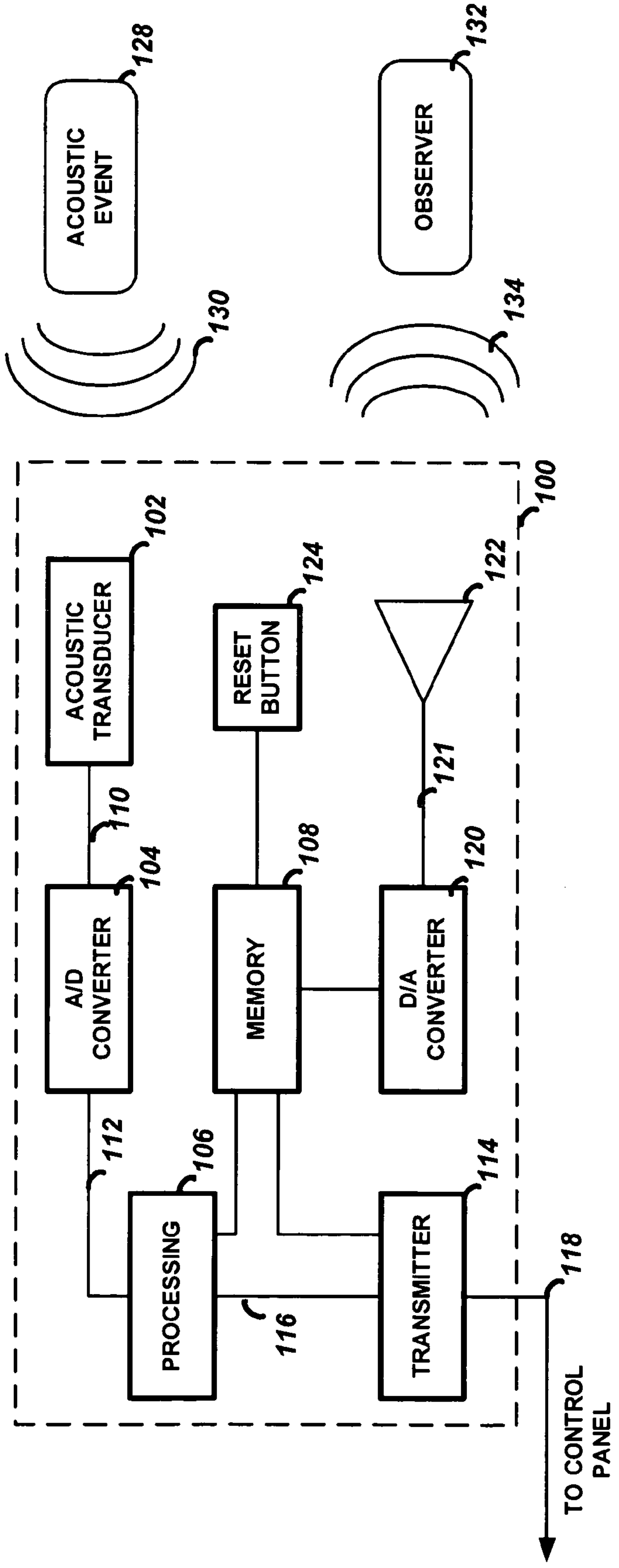
FIG. 1 is a block diagram of the glass breakage detector of the first embodiment of the present invention.

The preferred embodiments of the present invention will now be described with respect to the Figures. FIG. 1 illustrates a block diagram of a glass breakage detector 100, which is interconnected via data transmission path 118 to a security system (not shown) as well known in the art. For example, transmission path 118 may be a hardwired connection to a data bus, a data loop, or the like, which will also have other security system devices connected thereto (such as passive infrared detectors, door or window opening detectors, smoke or fire sensors, keypads, consoles, a control panel, etc.). Likewise, the data transmission path 118 may be a wireless (i.e. RF) connection as well known in the art. The glass breakage detector 100 of the present invention is located in proximity to glass in an area under surveillance such as a commercial establishment or a residential dwelling, as well known in the art.

The glass breakage detector 100 comprises several major components as illustrated in FIG. 1. An acoustic transducer 102 is shown which senses acoustic waves 130, which occur as a result of an acoustic event 128, over a wideband frequency range and translates them into an electrical signal that is then optionally amplified and results in a first analog signal 110. An analog-to-digital (A/D) converter 104 samples the analog signal 110 and translates it into a digital signal 112 as well known in the art. The digital signal 112 is then analyzed by processing circuitry 106 in order to ascertain if the acoustic event that produced the acoustic waves 130 was likely a breakage of glass such as a window pane or door pane. Processing circuitry 106 may be a microprocessor or microcomputer, a digital signal processor (DSP), or dedicated logic circuits, all as well known in the art. When the processing logic 106 determines that the acoustic event 128 is likely a glass breakage event, then it generates an alarm signal 116, which is transmitted by data transmission circuitry 114 to the security system control panel (not shown) via transmission path 118. As previously mentioned, the data transmission may be a wired or wireless transmission as desired.

Details of the determination of an alarm event (i.e. when it is determined that there has been a glass breakage event) is found in the prior art, for example in U.S. Pat. No. 6,351,214, which is owned by the assignee of the present invention and the specification of which is incorporated by reference herein.

The present invention is particularly implemented with respect to the following. A memory circuit 108, which may be flash memory, RAM, EEPROM, etc., is provided to store samples of the digital signal 112 as they are processed by the processing circuitry 106 and determined to be glass breakage events. Thus, when processing circuitry 106 analyzes a particular digital signal 112 and determines it to be a result of glass breakage such that an alarm signal 116 is generated and transmitted, then the digital signal 112 is also stored in memory 108. An event indicator such as a time/date stamp may also be stored with the digital signal 112 to aid in subsequent analysis as described further herein. Thus, memory 108 will hold one or more samples of digital signals that have been determined by the processing circuitry 106 to be a result of glass breakage. In addition, memory 108 may also store samples of digital signals 112 that are judged to not be the result of glass breakage so that they also may be subsequently analyzed. In this event, then a flag will also be stored with the digital signal 112 (and optional timestamp) to indicate if that signal 112 was judged to be a result of glass breakage (and thus that an alarm signal 116 was generated and transmitted), or if it was determined to not be a result of glass breakage.

After at least one digital signal 112 has been stored in memory 108, data may be retrieved from the memory for analysis. Analysis of the stored data may be done in one or more of available analysis modes. A local manual analysis mode may be used, in which the digital data is caused by an observer to be retrieved from the memory 108 and input into a digital-to-analog (D/A) converter 120 to provide a second analog signal 121, which will be nearly identical to the first analog signal 110 that was originally received (allowing for sampling approximations inherent in the A/D converter 104 and D/A converter 120 as known in the art).

This second analog signal 121 will be input into a speaker 122 to generate second acoustic waves 134, which may then be heard by an observer 132. The observer 132 may then make a manual determination if the second acoustic waves sound like a glass breakage event or not, and adjust the glass breakage detector accordingly. For example, if an observer determines that the event that caused an alarm to be generated and a digital signal to be stored in memory 108 was not a glass breakage event, he may adjust certain modifiable parameters of the processing circuitry 106 so that subsequent events with the same acoustic properties will not generate the alarm condition, and vice versa.

Another mode provides for remote analysis of the acquired and stored data. In this mode, digital data is read out of memory 108 under instruction of processing circuitry 106, and input to the transmitter 114 for transmission to the control panel (or other component) of the security system. The data may then be analyzed to determine if the events causing the alarms are glass breakage events or not as previously described.

A reset means is provided, such as a manual reset button 124, to enable an operator to clear or reset the memory 108 as desired; such as after data has been retrieved from memory 108 for analysis.

Figure 2:
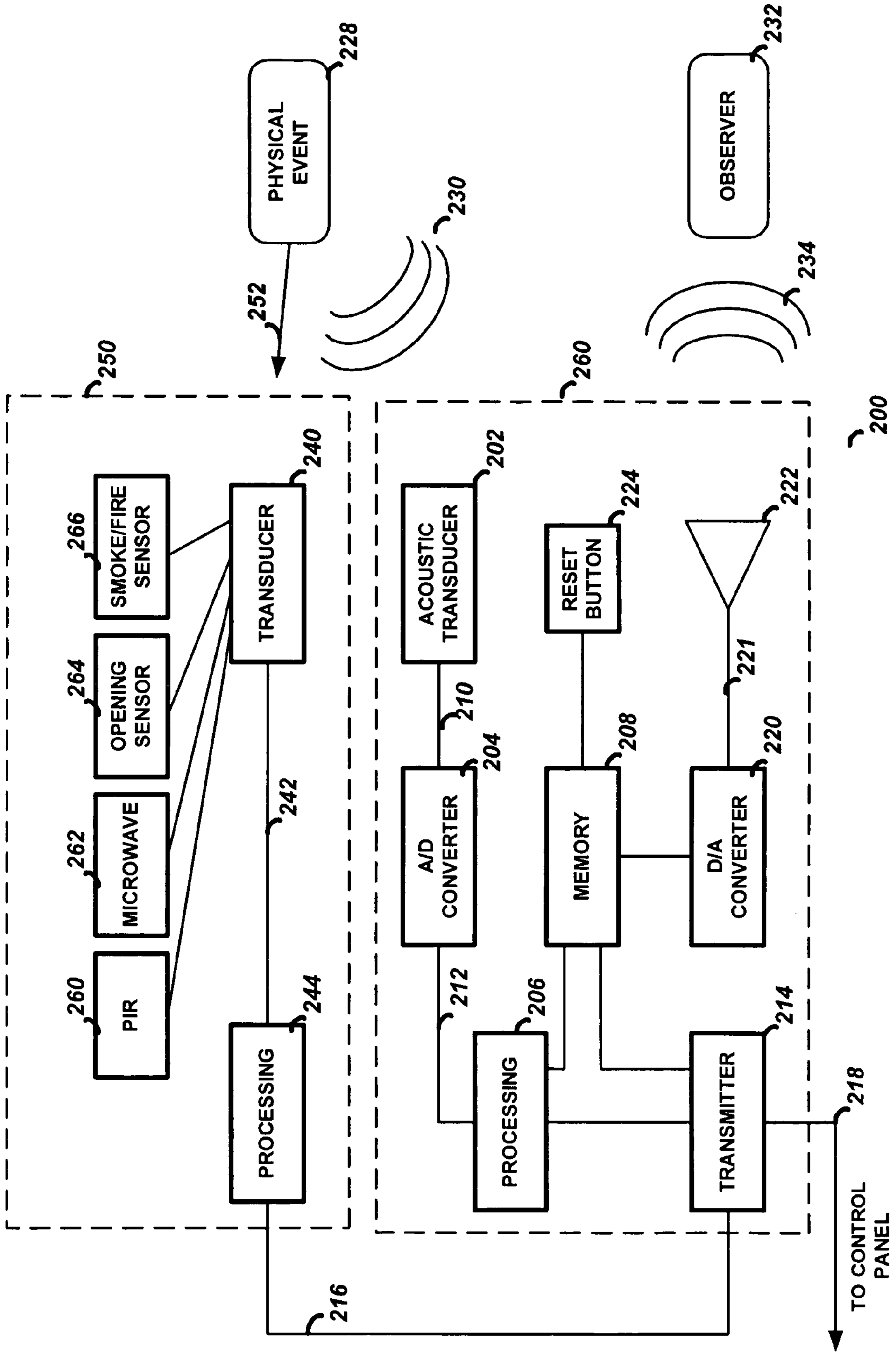
FIG. 2 is a block diagram of the security system device of the second embodiment of the present invention.
Figure 3:
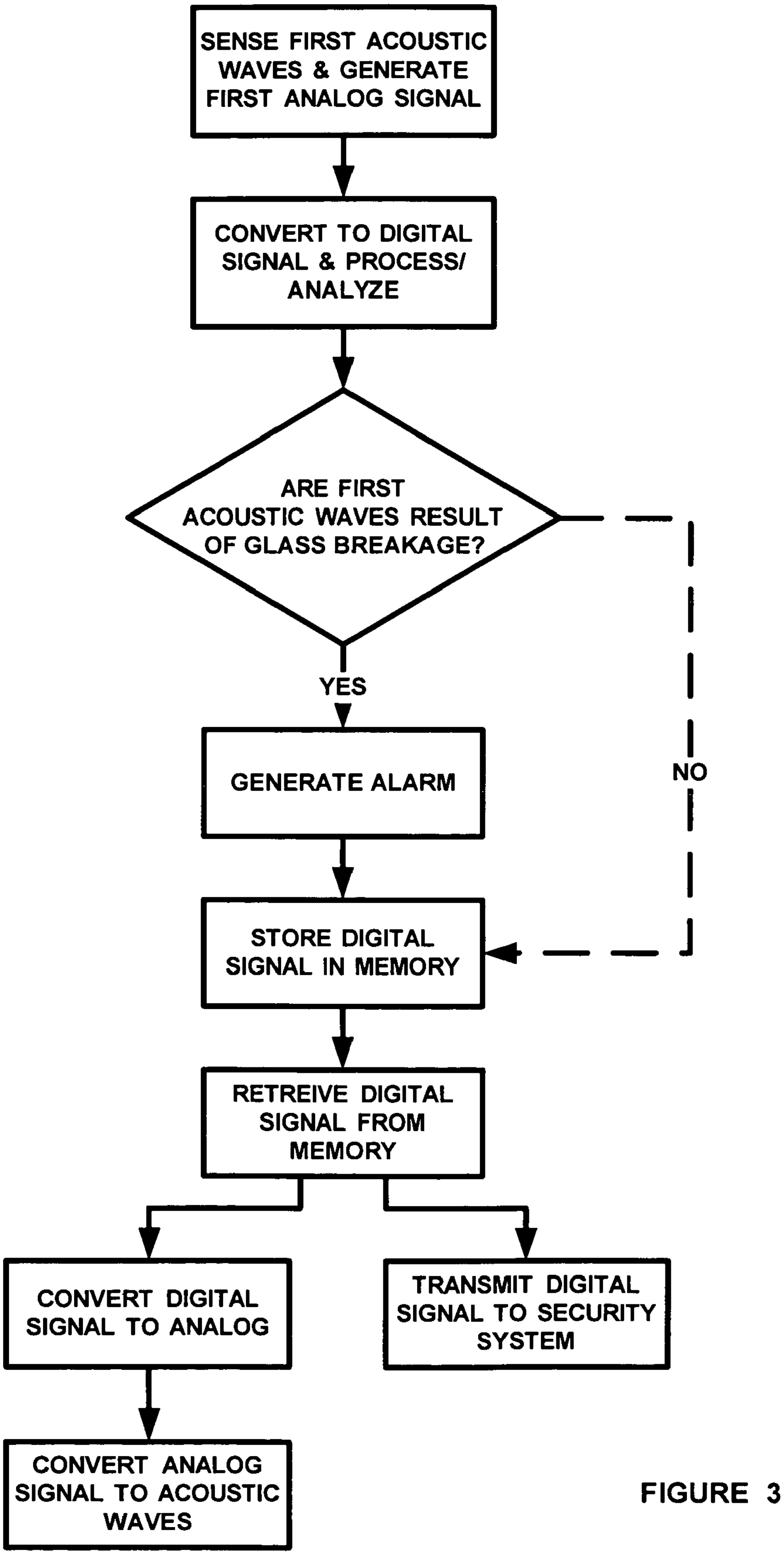
FIG. 3 is a flowchart of the present invention.

FIG. 2 illustrates the second embodiment of the present invention, in which the glass breakage monitoring/recordal/retrieval system is included with a different type of security system detector, such as a PIR device. FIG. 2 shows a security system device 200 that has an alarm device 250 and a glass breakage analysis unit 260. The alarm device has a first transducer 240 that is adapted to sense a physical event 228 in a protected space, in which a physical condition 252 is sensed by the transducer 240. For example, if the transducer is a PIR 260, then the physical event 228 will be a change in temperature in the protected space, which is detected by PIR 260 as well known in the art. The transducer 240 produces a first input signal 242 that is indicative of sensing the event 228, which is input to first processing circuitry 244. First processing circuitry 244 may be a microprocessor or microcomputer, a digital signal processor (DSP), or dedicated logic circuits, all as well known in the art. The first processing circuitry 244 is adapted to analyze the input signal 242 and generate an alarm signal 216 when the input signal 242 meets certain predefined criteria as well known in the art. For example, if the transducer is a smoke sensor 266, then the alarm signal 216 will be generated when smoke is detected by the smoke sensor 266 as well known in the art. The alarm signal 216 is then input to transmitter 214 for transmission on transmission path 218 to the security system (not shown).

The glass breakage analysis unit 260 is similar in design and operation to the device described in FIG. 1. Thus, an acoustic transducer 202 senses first acoustic waves 230 that are generated in conjunction with the physical event 228, and a first analog signal 210 is generated and input to an A/D converter 204. The A/D converter 204 converts the first analog signal 210 to a digital signal 212, which is then analyzed by second processing circuitry 206. Second processing circuitry 206 may be a microprocessor or microcomputer, a digital signal processor (DSP), or dedicated logic circuits, all as well known in the art. In addition, the functionalities of the first processing circuitry 244 and the second processing circuitry 206 may be carried out by the same circuitry or microprocessor rather than independent units. In any event, a memory circuit 208, which may be flash memory, RAM, EEPROM, etc., is provided to store samples of the digital signal 212 as they are processed by the processing circuitry 206 and determined to be glass breakage events. Thus, when processing circuitry 206 analyzes a particular digital signal 212 and determines it to be a result of glass breakage, then the digital signal 212 is also stored in memory 108. An event indicator such as a time/date stamp may also be stored with the digital signal 212 to aid in subsequent analysis as described further herein. Thus, memory 208 will hold one or more samples of digital signals that have been determined by the processing circuitry 206 to be a result of glass breakage. In addition, memory 208 may also store samples of digital signals 212 that are judged to not be the result of glass breakage so that they also may be subsequently analyzed. In this event, then a flag will also be stored with the digital signal 212 (and optional timestamp) to indicate if that signal 212 was judged to be a result of glass breakage, or if it was determined to not be a result of glass breakage. The stored data may also indicate if the processing circuitry 244 generated an alarm signal 216 as a result of determining that the physical event 252 was alarm-causing, in accordance with the particular transducer 240 present in the device 200.

After at least one digital signal 212 has been stored in memory 208, data may be retrieved from the memory for analysis. Analysis of the stored data may be done in one or more of available analysis modes. A local manual analysis mode may be used, in which the digital data is caused by an observer to be retrieved from the memory 208 and input into a digital-to-analog (D/A) converter 220 to provide a second analog signal 221, which will be nearly identical to the first analog signal 210 that was originally received (allowing for sampling approximations inherent in the A/D converter 204 and D/A converter 220 as known in the art). This second analog signal 221 will be input into a speaker 222 to generate second acoustic waves 234, which may then be heard by an observer 232. The observer 232 may then make a manual determination if the second acoustic waves sound like a glass breakage event or not, and adjust the glass breakage detector accordingly. For example, if an observer determines that the event that caused an alarm to be generated and a digital signal to be stored in memory 208 was not a glass breakage event, he may adjust certain modifiable parameters of the processing circuitry 206 so that subsequent events with the same acoustic properties will not generate the alarm condition, and vice versa.

Another mode provides for remote analysis of the acquired and stored data. In this mode, digital data is read out of memory 208 under instruction of processing circuitry 206, and input to the transmitter 214 for transmission to the control panel (or other component) of the security system. The data may then be analyzed to determine if the events causing the alarms are glass breakage events or not as previously described.

A reset means is provided, such as a manual reset button 224, to enable an operator to clear or reset the memory 208 as desired; such as after data has been retrieved from memory 208 for analysis.

What is claimed is:

1. A glass breakage detector comprising:

a. an acoustic transducer for sensing first acoustic waves and for providing a first analog signal representative of the received first acoustic waves, b. an analog to digital converter circuit adapted to convert the first analog signal to a digital signal;

c. processing circuitry adapted to i. process the digital signal to determine if the received first acoustic waves are a result of glass breakage; and ii. generate an alarm signal when it is determined that the received first acoustic waves are a result of glass breakage;

d. a memory circuit;

wherein the processing circuitry is adapted to cause the memory circuit to store the digital signal for subsequent retrieval and analysis;

e. a digital to analog converter adapted to convert a digital signal stored in the memory circuit to a second analog signal; and f. a speaker adapted to convert the second analog signal to second acoustic waves;

wherein the processing circuitry is further adapted to i. retrieve a previously stored digital signal from the memory circuit, and ii. cause the digital to analog converter to convert the digital signal to a second analog signal for conversion to second acoustic waves suitable for being heard locally by an observer of the glass breakage detector.

2. The glass breakage detector of claim 1 wherein the processing circuitry is further adapted to cause the memory circuit to store the digital signal when the processing circuitry determines that the received first acoustic waves are a result of glass breakage.

3. The glass breakage detector of claim 1 further comprising means for resetting the memory circuit.

4. The glass breakage detector of claim 2 further comprising data transmission circuitry;

wherein the processing circuitry is further adapted to iii. retrieve a previously stored digital signal from the memory circuit, and iv. cause the data transmission circuitry to transmit the digital signal over a data transmission path to which the data transmission circuitry is operably coupled.

5. A security system device comprising:

a. an alarm device comprising:

i. a first transducer adapted to sense a physical event in a protected space and generate an input signal indicative of sensing the physical event; and ii. first processing circuitry adapted to analyze the input signal and generate an alarm signal when the input signal meets predefined criteria;

b. an acoustic transducer for sensing first acoustic waves and for providing a first analog signal representative of the received first acoustic waves, c. an analog to digital converter circuit adapted to convert the first analog signal to a digital signal;

d. a memory circuit; and e. second processing circuitry adapted to cause the memory circuit to store the digital signal for subsequent retrieval and analysis;

wherein the memory circuit stores the digital signal when the second processing circuitry determines that the received first acoustic waves are a result of glass breakage;

f. a digital to analog converter adapted to convert a digital signal stored in the memory circuit to a second analog signal; and g. a speaker adapted to convert the second analog signal to second acoustic waves;

wherein the second processing circuitry is further adapted to i. retrieve a previously stored digital signal from the memory circuit, and ii. cause the digital to analog converter to convert the digital signal to a second analog signal for conversion to second acoustic waves suitable for being heard locally by an observer of the security system device.

6. The security system device of claim 5 further comprising means for resetting the memory circuit.

7. The security system device of claim 5 wherein the memory circuit stores the digital signal when the first processing circuitry generates an alarm signal.

8. The security system device of claim 5 further comprising data transmission circuitry;

wherein the second processing circuitry is further adapted to i. retrieve a previously stored digital signal from the memory circuit, and ii. cause the data transmission circuitry to transmit the digital signal over a data transmission path to which the data transmission circuitry is operably coupled.

9. The security system device of claim 5 wherein the alarm device comprises a passive infrared motion sensor.

10. The security system device of claim 5 wherein the alarm device comprises a microwave motion sensor.

11. The security system device of claim 5 wherein the alarm device comprises a window or door opening sensor.

12. The security system device of claim 5 wherein the alarm device comprises a smoke alarm.

13. A method of operating a glass breakage detector comprising:

a. sensing by an acoustic transducer first acoustic waves;

b. providing by the acoustic transducer a first analog signal representative of the sensed first acoustic waves, c. converting the first analog signal to a digital signal;

d. processing the digital signal to determine if the received first acoustic waves are a result of glass breakage;

e. generating an alarm signal when it is determined that the received first acoustic waves are a result of glass breakage;

f. storing in a memory circuit the digital signal for subsequent retrieval and analysis;

g. retrieving a previously stored digital signal from the memory circuit, h. converting the digital signal to a second analog signal; and i. converting the second analog signal to second acoustic waves suitable for being heard locally by an observer of the detector.

14. The method of claim 13 further comprising the step of storing the digital signal when it is determined that the received first acoustic waves are a result of glass breakage.

15. The method of claim 14 further comprising the steps of:

retrieving a previously stored digital signal from the memory circuit, and transmitting the digital signal over a data transmission path.

16. A method of operating a security system device comprising:

a. sensing by a first transducer a physical event in a protected space;

b. generating an input signal indicative of sensing the physical event;

c. analyzing the input signal and generating an alarm signal when the input signal meets predefined criteria;

d. sensing with an acoustic transducer first acoustic waves;

e. providing a first analog signal representative of the sensed first acoustic waves, f. converting the first analog signal to a digital signal;

g. storing in a memory circuit the digital signal for subsequent retrieval and analysis;

wherein storing the digital signal when it is determined that the first acoustic waves are a result of glass breakage;

h. retrieving a previously stored digital signal from the memory circuit, i. converting the digital signal to a second analog signal; and j. converting the second analog signal to second acoustic waves suitable for being heard locally by an observer of the security system device.

17. The method of claim 16 further comprising the step of storing the digital signal when an alarm signal is generated.

* * * * *

UNITED STATES PATENT AND TRADEMARK OFFICE

CERTIFICATE OF CORRECTION

PATENT NO. : 7,319,392 B2
APPLICATION NO. : 11/193886
DATED : January 15, 2008
INVENTOR(S) : Babich et al.

It is certified that error appears in the above-identified patent and that said Letters Patent is hereby corrected as shown below:

Title Page:
Item (75): the inventor "Thomas R Petek" should read --Tom R Petek--

Signed and Sealed this

Twelfth Day of August, 2008

JON W. DUDAS
*Director of the United States Patent and Trademark Office*